Jan. 3, 1967   G. ARSHALL   3,295,608
VORTEX GENERATOR

Filed Jan. 5, 1966   2 Sheets-Sheet 1

INVENTOR:
George Arshal

Jan. 3, 1967  G. ARSHALL  3,295,608
VORTEX GENERATOR
Filed Jan. 5, 1966  2 Sheets-Sheet 2

INVENTOR:
George Arshal

United States Patent Office 3,295,608
Patented Jan. 3, 1967

3,295,608
VORTEX GENERATOR
George Arshal, 714 Ardmore Ave.,
Redlands, Calif. 92373
Filed Jan. 5, 1966, Ser. No. 518,860
14 Claims. (Cl. 170—135)

This application is a continuation in part of pending patent application No. 297,105, filed July 23, 1963, now abandoned.

The invention is a means of circulating fluid in confinement against a closed or open boundary. The usual practice for circulating fluid that is so confined is to draw fluid into a pump and eject it into the circulating stream in the form of high velocity jets tangent to the boundary. The process is inefficient, it produces turbulence, and it does not encourage stability of circulation. The vortex generator described herein dispenses with jet injection altogether. It produces a rotational core of fluid within the fluid section. This rotational core is efficiently generated, it naturally develops circulation about itself, and it positively forms the low pressure center necessary for stable circulation.

Figure 5:
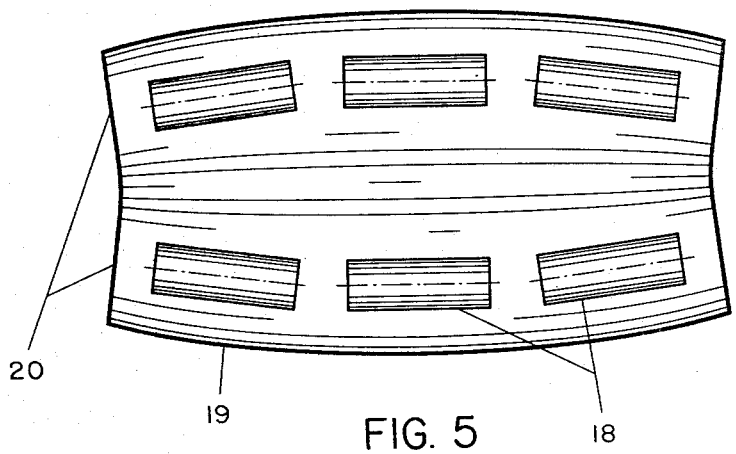
Figure 6:
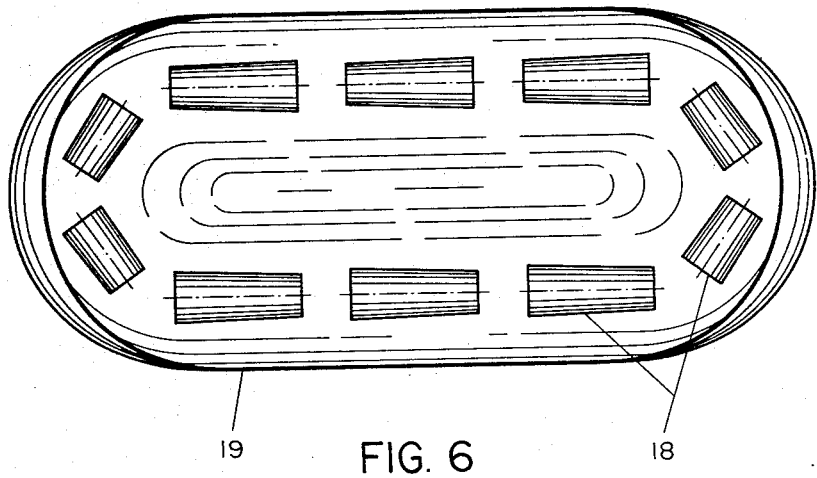
Figure 7:
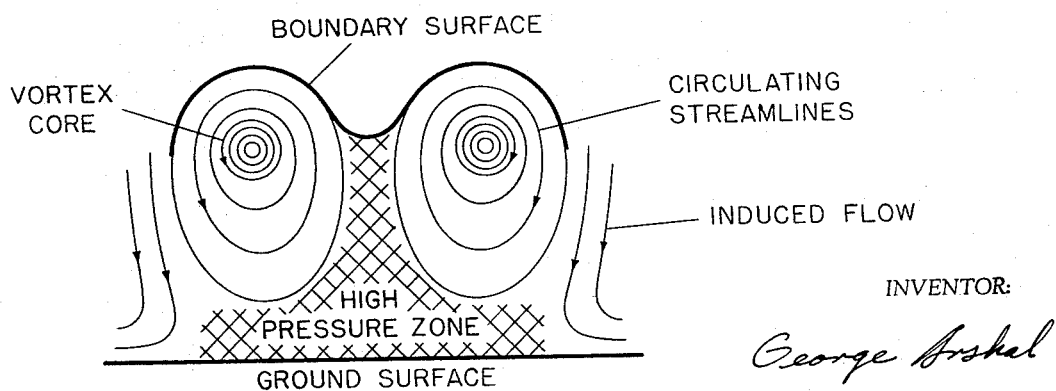

FIGS. 1 through 4 illustrate different embodiments of the vortex generator. FIGS. 5 and 6 show possible layouts of the vortex generators for producing extensive vortex systems. The layouts are related to a boundary surface for confining the vortex system. FIG. 7 represents an application of the invention; it shows a sectional view of the generated vortex system relative to a boundary surface forming the underside of a ground effect machine. The fluid properties attending the resulting circulations are indicated.

Figure 1:
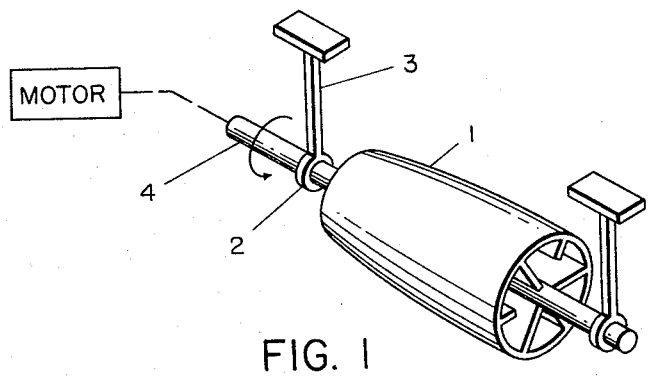

In FIG. 1, the vortex generator 1 is shown as a tapered, hollow, open ended cylinder with internal baffles. It can be mounted to rotate with bearings 2 and supports 3 wherever it is desired to produce a center of fluid vorticity. A motor rotates the cylinder through the drive shaft 4.

The taper given to the cylinder makes it act as an axial pump so that it draws fluid from its smaller open end and expels it at the other end. But this flow rate is modest and the fluid elements in transit spend time in the substantially closed confines of the cylinder. During this interim, the cylinder imparts rotation to the fluid elements and they leave to form a rotating core continuous with the fluid core in the cylinder.

The taper of the cylinder as shown (FIG. 1) is non-uniform so that the cylinder is cambered, but this characteristic is inessential. A straight taper can be used or the taper can be omitted altogether. The important thing here is that an axially symmetric, rotating vessel imparts rotational motion to the fluid filling it as long as the fluid is substantially entrapped. The action of rotating the fluid is independent of fluid viscosity and proceeds with high efficiency.

Figure 2:
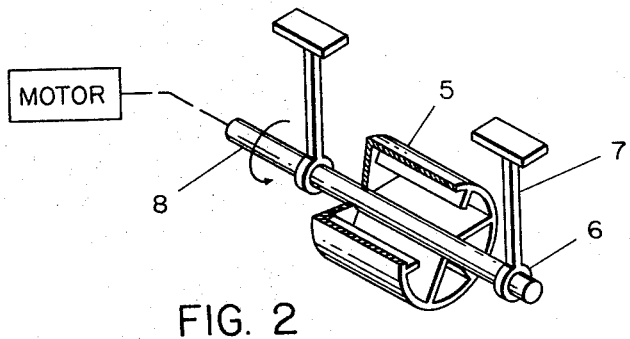

In FIG. 2, the vortex generator 5 is shown in a cutaway view with one end closed off. It is otherwise similar to the vortex generator of FIG. 1. Bearings 6 and supports 7 mount the shaft 8 of the vortex generator for rotation by a motor. When the vortex generator has one of its ends closed off, it can be half as long as a doubly open ended vortex generator and retain an equal ability of holding fluid substantially entrapped (other things including the manner of application being equal).

Figure 3:
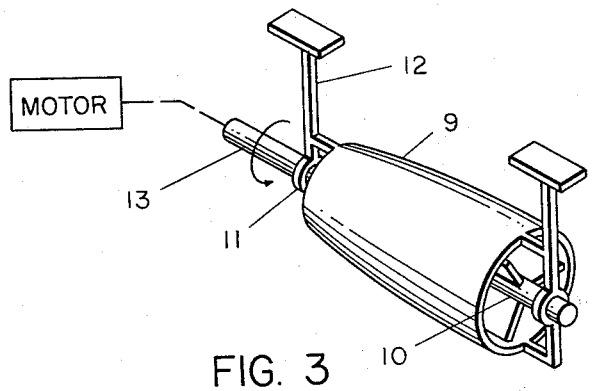

The vortex generator illustrated in FIG. 3 performs like the vortex generator of FIG. 1 but not as efficiently. The outer shell 9 is held fixed and the fluid within it is rotated by a vaned shaft 10. Bearings 11 and supports 12 position both the vaned shaft and the outer shell. A motor rotates the vaned shaft through the shaft extension 13. This arrangement entails viscous losses between the rotating fluid and the surface of the shell. However, special considerations may require the use of a stationary shell. The stationary shell also provides a ready means of bending the vortex core. The vortex core can be so guided through a curved, axial extension of the shell at either end of the rotating vanes.

Figure 4:
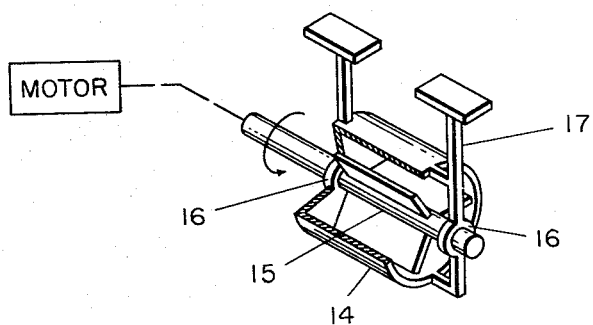

In FIG. 4, the vortex generator of FIG. 3 is altered into a shortened unit with one end closed off. Bearings 16 and supports 17 position both the vaned shaft 15 and the outer shell 14. A motor rotates the vaned shaft.

In general, a series of the vortex generators will be utilized to form a vortex core of extended length. The vortex generators would be spaced along a line or curve describing a loop or else terminating at end boundary sections. The fluid vortex elements will naturally form into lines running through the interspaces of the vortex generators. This result is assured with or without axial flow through the generators. Axial flow can influence the variation in the vorticity obtained along the length of the vortex core.

FIGS. 5 and 6 show representative layouts of the vortex generators. In each case, the vortex generators 18 are accompanied by a boundary surface 19 spreading over one side of the vortex generators. In FIG. 5, the boundary surface includes end sections 20. FIG. 6 shows no end sections since the boundary surface curves around the closed loop projected by the vortex generators.

The interspaces between the vortex generators afford continuity and interaction between the vortex core and the adjacent, surrounding fluid. The vortex core induces coaxial circulation in the surrounding fluid. The boundary surface serves to confine this rotating and circulating fluid. However, the boundary formed about the vortex system must be contrived with care, especially when it is a partial boundary. Vortex rings or parallel vortex cores and the like tend to interact among their constituent elements and to propel themselves and their attending bodies of circulating fluid. Under this self propulsion, the vortex cores and their associated circulations develop an enveloping pressure distribution that enables them to stabilize and persist. When the vortex system is denied self propulsion, either wholly or partly, the restraining boundary must be shaped so that it produces a pressure distribution consistent with stability of the vortex system.

FIG. 7 illustrates an application of the invention in a ground effect machine. A sectional view of the underside of the ground effect machine is diagrammed. The configuration represented is that of FIG. 5 or 6. The vortex generators suspended below the undersurface of the ground effect machine produce the indicated fluid motions.

The fluid between the two circulating systems and the ground (FIG. 7) is essentially motionless and forms a zone of high pressure because of the velocity potential built up in the circulations. This high pressure zone raises the vehicle. It also extends in between the two circulating systems because of the dip in the boundary surface. The intervening pressure prevents the two circulating systems from drawing together and disrupting each other. This is the case when the vortex systems are relatively close enough so that their circulating fields present a tendency to draw together. If they are too far apart, the circulating fields tend to push further apart and out at the open sides because of excessive intervening pressure.

The high pressure that is formed over the ground assists the low pressure at the vortex centers in turning in the bottom portions of the circulations. The circulating streamlines diverge in these regions and further raise the vehicle since the necessary radial pressure gradients are available over a greater span of distance.

However, the invention is not limited to applications in ground effect machines and the inventor claims:
 1. In combination, a vessel having a central axis and including internal means of checking coaxial fluid circulation relative to itself, said vessel being open at each end, means of supporting said vessel for rotation about its axis, said means of support being attached to a mechanical structure, the said vessel being immersed in fluid, driving means to rotate the said vessel, whereby the fluid in said vessel is rotated to generate a vortex and induce circulation in the fluid around said vortex, and a boundary surface structure serving to confine the said fluid circulation, said surface structure forming a barrier proximate to the said vessel and being attached to the said mechanical structure.

2. In combination, a plurality of vortex generators, each vortex generator being a vessel having a central axis and including internal means of checking coaxial fluid circulation relative to itself, said vessel being open at each end, means of supporting the said plurality of vortex generators for rotation about their respective axes, said means of support being attached to a mechanical structure, the said vortex generators being interspaced along the path of a closed loop and immersed in fluid, driving means to rotate the said vortex generators, the rotation of each vortex generator being compatible with the rotation of its neighboring vortex generator, whereby the fluid in the said vortex generators is rotated to produce a vortex and induce circulation in the fluid about said vortex, and a boundary surface structure serving to confine the fluid circulation produced by the said plurality of vortex generators, said surface structure forming a barrier proximate to the said vortex generators on one side of said loop and being attached to the said mechanical structure.

3. In combination, a plurality of vortex generators, each vortex generator being a vessel having a central axis and including internal means of checking coaxial fluid circulation relative to itself, said vessel being open at each end, means of supporting the said plurality of vortex generators for rotation about their respective axes, said means of support being attached to a mechanical structure, the said vortex generators being immersed in fluid, driving means to rotate the said vortex generators, whereby the fluid in each said vortex generator is rotated to produce a vortex and induce circulation in the fluid about said vortex, the said plurality of vortex generators being disposed to produce dual systems of fluid vorticity and circulation, one as the inverse counterpart of the other with respect to an intermediate reference plane, and a boundary surface structure serving to confine the circulation of the said fluid systems, said surface structure cutting across the said reference plane, forming a barrier proximate to the said vortex generators, and being attached to the said mechanical structure.

4. In combination, a vortex generator comprising a vessel having a central axis and a rotatable member mounted for rotation within said vessel about said central axis, said vortex generator being open at each end, said rotatable member including means of checking coaxial fluid circulation relative to itself, means of supporting said vortex generator, said means of support being attached to a mechanical structure, said vortex generator being immersed in fluid, driving means to rotate the said rotatable member, whereby the fluid in said vortex generator is rotated to generate a vortex and induce circulation in the fluid about said vortex, and a boundary surface structure serving to confine the said fluid circulation, said surface structure forming a barrier proximate to the said vortex generator and being attached to the said mechanical structure.

5. In combination, a plurality of vortex generators, each vortex generator comprising a vessel having a central axis and a rotatable member mounted for rotation within said vessel about said central axis, said vortex generator being open at each end, said rotatable member including means of checking coaxial fluid circulation relative to itself, means of supporting the said plurality of vortex generators, said means of support being attached to a mechanical structure, the said vortex generators being interspaced along the path of a closed loop and immersed in fluid, driving means to rotate the said vortex generators, the rotations being applied to the said rotatable members, said rotation of each vortex generator being compatible with the rotation of its neighboring vortex generator, whereby the fluid in the said vortex generator is rotated to produce a vortex and induce circulation in the fluid about said vortex, and a boundary surface structure serving to confine the fluid circulation produced by the said plurality of vortex generators, said surface structure forming a barrier proximate to the said vortex generators on one side of said loop and being attached to the said mechanical structure.

6. In combination, a plurality of vortex generators, each vortex generator comprising a vessel having a central axis and a rotatable member mounted for rotation within said vessel about said central axis, said vortex generator being open at each end, said rotatable member including means of checking coaxial fluid circulation relative to itself, means of supporting the said plurality of vortex generators, said means of support being attached to a mechanical structure, the said vortex generators being immersed in fluid, driving means to rotate the said vortex generators, the rotations being applied to the said rotatable members, whereby the fluid in each said vortex generator is rotated to produce a vortex and induce circulation in the fluid about said vortex, the said plurality of vortex generators being disposed to produce dual systems of fluid vorticity and circulation, one as the inverse counterpart of the other with respect to an intermediate reference plane, and a boundary surface structure serving to confine the circulations of the said fluid, said surface structure cutting across the said reference plane, forming a barrier proximate to the said vortex generators, and being attached to the said mechanical structure.

7. In combination, a vessel having a central axis and including internal means of checking coaxial fluid circulation relative to itself, said vessel being open at one end, means of supporting said vessel for rotation about its axis, said means of support being attached to a mechanical structure, the said vessel being immersed in fluid, driving means to rotate the said vessel, whereby the fluid in said vessel is rotated to generate a vortex and induce circulation in the fluid around said vortex, and a boundary surface structure serving to confine the said fluid circulation, said surface structure forming a barrier proximate to the said vessel and being attached to the said mechanical structure.

8. In combination, a vortex generator comprising a vessel having a central axis and a rotatable member mounted for rotation within said vessel about said central axis, said vortex generator being open at one end, said rotatable member including means of checking coaxial fluid circuation relative to itself, means of supporting said vortex generator, said means of support being attached to a mechanical structure, said vortex generator being immersed in fluid, driving means to rotate the said rotatable member, whereby the fluid in said vortex generator is rotated to generate a vortex and induce circulation in the fluid about said vortex, and a boundary surface structure serving to confine the said fluid circulation, said surface structure forming a barrier proximate to the said vortex generator and being attached to the said mechanical structure.

9. In combination, a vortex generator comprising a vessel having a central axis and internal rotatable means for engaging fluid in rotation about said axis, said vortext generator being open at either end, means of supporting said vortex generator, said means of support being attached to a mechanical structure, the said vortex generator being immersed in fluid, driving means to rotate the said internal means, whereby the fluid in said vortex generator is rotated to generate a vortex and induce circulation in the fluid about said vortex, and a boundary surface structure serving to confine the said fluid circulation, said surface structure forming a barrier proximate to the said vortex generator and being attached to the said mechanical structure.

10. The combination of claim 9 wherein the said vessel is stationary relative to the said means of support and the central axis of said vessel is curved.

11. In combination, a vortex generator comprising a vessel having a central axis and means for engaging fluid within said vessel in rotation about said axis, said vortex generator being open at either end, means of supporting said vortex generator, said means of support being attached to a mechanical structure, the said vortex generator being immersed in fluid, driving means to operate the said vortex generator, whereby the fluid in said vortex generator is rotated to produce a vortex and induce circulation in the fluid about said vortex, and a boundary surface structure serving to confine the said fluid circulation, said surface structure forming a barrier proximate to the said vortex generator and being attached to the said mechanical structure.

12. The combination of claim 11 wherein the said vessel is stationary relative to the said means of support and the central axis of said vessel is curved.

13. In combination, a plurality of vortex generators, each vortex generator comprising a vessel having a central axis and means for engaging fluid within said vessel in rotation about said axis, said vortex generator being open at either end, means of supporting the said plurality of vortex generators, said means of support being attached to a mechanical structure, the said vortex generators being interspaced along the path of a closed loop and immersed in fluid, driving means to operate the said vortex generators, whereby the fluid in each said vortex generator is rotated to produce a vortex and induce circulation in the fluid about said vortex, said rotation of each vortex generator being compatible with that of its neighboring vortex generator, and a boundary surface structure serving to confine the fluid circulation produced by the said plurality of vortex generators, said surface structure forming a barrier proximate to the said vortex generators on one side of said loop and being attached to the said mechanical structure.

14. In combination, a plurality of vortex generators, each vortex generator comprising a vessel having a central axis and means for engaging fluid within said vessel in rotation about said axis, said vortex generator being open at either end, means of supporting the said plurality of vortex generators, said means of support being attached to a mechanical structure, the said vortex generators being immersed in fluid, driving means to operate the said vortex generators, whereby the fluid in each said vortex generator is rotated to produce a vortex and induce circulation in the fluid about said vortex, the said plurality of vortex generators being disposed to produce dual systems of fluid vorticity and circulation, one as the inverse counterpart of the other with respect to an intermediate reference plane, and a boundary surface structure serving to confine the circulations of the said fluid systems, said surface structure cutting across the said reference plane, forming a barrier proximate to the said vortex generators, and being attached to the said mechanical structure.

References Cited by the Examiner

UNITED STATES PATENTS

| 1,843,926 | 2/1932 | MacCaskie | 60—35.5 |
| 3,117,644 | 1/1964 | Cockerell | 180—7 |
| 3,117,646 | 1/1964 | Cockerell et al. | 180—7 |

FOREIGN PATENTS

| 600,073 | 6/1960 | Canada. |
| 162,066 | 4/1921 | Great Britain. |
| 421,528 | 6/1934 | Great Britain. |

MARTIN P. SCHWADRON, *Primary Examiner.*

E. A. POWELL, *Assistant Examiner.*